US006181677B1

(12) United States Patent
Valli et al.

(10) Patent No.: US 6,181,677 B1
(45) Date of Patent: Jan. 30, 2001

(54) METHOD AND APPARATUS FOR DETECTION AND PROTECTION AGAINST DATA LOSS IN A FRACTIONAL T1/E1 COMMUNICATIONS ENVIRONMENT

(75) Inventors: Ron Valli, Boca Raton; Sam Hitchcock, Tamarac; Ulises Sala, Sunrise, all of FL (US)

(73) Assignee: Milgo Solutions, Inc., Sunrise, FL (US)

( * ) Notice: Under 35 U.S.C. 154(b), the term of this patent shall be extended for 0 days.

(21) Appl. No.: 09/025,032

(22) Filed: Feb. 18, 1998

(51) Int. Cl.[7] .................... G06F 11/00; H04J 3/16
(52) U.S. Cl. .................. 370/228; 370/251; 370/465; 375/267; 379/15
(58) Field of Search ................... 370/249, 250, 370/251, 228, 241, 420, 465; 375/224, 260, 267; 379/1, 2, 4, 6, 10, 15, 30, 27, 29

(56) References Cited

U.S. PATENT DOCUMENTS

| | | | |
|---|---|---|---|
| 4,980,887 | * 12/1990 | Divelt et al. ..................... 379/4 |
| 4,991,196 | 2/1991 | Krebs ............................. 379/27 |
| 5,210,740 | 5/1993 | Anzai et al. ..................... 370/251 |
| 5,337,306 | * 8/1994 | Hall .............................. 370/250 |
| 5,343,461 | * 8/1994 | Barton et al. ................... 370/249 |
| 5,495,516 | 2/1996 | Lee et al. ....................... 379/27 |
| 5,524,111 | 6/1996 | Le Pennec et al. ............... 370/465 |
| 5,687,214 | 11/1997 | Steefel .......................... 370/241 |
| 5,734,696 | 3/1998 | Day ............................... 379/15 |

* cited by examiner

Primary Examiner—Alpus H. Hsu
Assistant Examiner—Afsar M. Qureshi
(74) Attorney, Agent, or Firm—Nixon & Vanderhye P.C.

(57) ABSTRACT

A method and apparatus for protection against loss of data in a fractional T1/E1 communications environment utilizes a message signaling arrangement between data service units and/or channel service units (DSU/CSU) to detect interruption in data transference occurring within a common carrier network due, for example, to an out-of-service condition. A "heartbeat" signal in a proprietary message format is generated and sent on a periodic basis to one or more destination DSUs/CSUs through the common carrier network over a separate T1/E1 maintenance channel. A selectable duration watchdog timer at each DSU/CSU is reset every time a heartbeat signal message is received from a remote unit. If the heartbeat signal is not received within the specified amount of time, the watchdog timer expires triggering the DSU/CSU to enter a dial back-up mode wherein an alternate communications link is established. The "heartbeat" method of the present invention thus results in faster detection of a loss of network communications condition in T1/E1 fractional environment than other more conventional methods such as, for example, a UNIX "ping" command.

10 Claims, 2 Drawing Sheets

METHOD AND APPARATUS FOR DETECTION AND PROTECTION AGAINST DATA LOSS IN A FRACTIONAL T1/E1 COMMUNICATIONS ENVIRONMENT

FIELD OF THE INVENTION

The present invention relates to digital communications in a T1 or E1 digital communications network environment. More particularly, it is directed toward protection against loss of data in a fractional T1/E1 communication environment due to an out-of-service condition occurring within a digital communications carrier network.

BACKGROUND OF THE INVENTION

In a corporate (i.e., non-fractional) T1 or E1 digital communications network environment, communication line conductivity and signal/data quality assertion is provided by conventional T1/E1 protocol maintenance signals. These maintenance signals provide assurance against data loss occurring anywhere from the customer's data service unit/ channel service unit (DSU/CSU) equipment, continuing through the commercial carrier's central office (CO), the carrier network itself, other connecting central offices of the carriers, and finally through to the customer unit at the destination. Unfortunately, these maintenance signals do not provide the same end-to-end coverage in a fractional T1/E1environment.

In a "fractional" T1/E1 environment, the conventional T1/E1 maintenance signaling techniques will only cover the connection between customer equipment and the carrier network. Consequently, an interruption of service resulting in data loss may go undetected if it occurs within the commercial carrier network. For example, conventional T1/E1 maintenance signals cannot detect the loss of a DS0 channel or an out-of-service condition (OSS) (assuming the integrity of the customer-to-central office connection is maintained). Merely attempting to detect an absence of data is not feasible in a traditional T1/E1 environment because a DS0 time slot in a fractional T1/E1 network is not guaranteed to be a constant when data is not present. One solution has been proposed that entails initiating a Unix-type "ping" messaging arrangement wherein one unit sends a query or test message to another unit which upon receiving the message then reciprocates with a return message indicating that the query was received. A major drawback with this arrangement is that it incurs unavoidable network transmission path delays for each message (i.e., the "ping" must travel through the T1/E1 network twice) in addition to some processing delay at the remote unit. The cumulative delay incurred is often unacceptable for meeting various user requirements. Accordingly, there is a long-felt need for a more efficient signaling arrangement that would allow a user of a fractional T1/E1 digital communications carrier network to protect against a loss of data in the event of a data interruption in the carrier network without incurring unacceptable delays. The present invention solves this problem by utilizing a unique "heartbeat" signalling arrangement that incurs only a single path delay through the T1/E1 network, thus permitting a much faster detection of a loss of communication condition in fractional networks.

SUMMARY OF THE INVENTION

The present invention addresses the problem of detecting and contending with data interruptions that may occur within a carrier network of a fractional T1/E1 communications environment. In a fractional T1/E1 environment, when service is interrupted in the carrier network, a user of the network has no way of efficiently detecting the interruption. A method and apparatus disclosed herein allows the user of a fractional T1/E1 network to quickly determine when such interruptions occur so that corrective actions may be immediately taken.

In accordance with an embodiment of the present invention, each active data service unit or channel service unit (DSU/CSU) making up a user's network is adapted to generate and send a periodic indication that the unit is active. This periodic indication or "heartbeat" message is sent to other receiving units through the digital carrier network via a bit-stealing in-band dedicated channel. Each DSU/CSU is also adapted to monitor the message transmission activity of one or more remote units. If a heartbeat signal message is not received within a predetermined amount of time a service interruption condition is declared. Accordingly, the user of a carrier network in a fractional T1/E1 environment is notified when data interruptions occur in the network and when the network is non-responsive.

In an example embodiment of the invention, a digital communications network is comprised of conventional DSUs/CSUs interconnected via a fractional T1 carrier network. Each DSU/CSU is programmed to generate and send a "heartbeat" signal to other DSUs/CSUs within the network. This heartbeat signal is sent periodically at a predetermined selectable rate and is carried as a proprietary message on a dedicated embedded T1 service channel. Each DSU/CSU also maintains at least one programmable watchdog timer mechanism, implemented in either hardware or software. When a heartbeat signal message is received from a remote unit, the receiving DSU/CSU resets its corresponding watchdog timer mechanism. If the heartbeat message is not received before the predetermined duration of the timer expires, the affected DSU/CSU locally provides a "loss of remote communications" (LRC) indication and/or enters a "dial back-up" mode wherein alternate communications channels are automatically established. Once the primary communications channel through the T1 carrier network is restored and remains established for a predetermined amount of time, the affected DSU/CSU reverts to its normal operation.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENT

Figure 1:
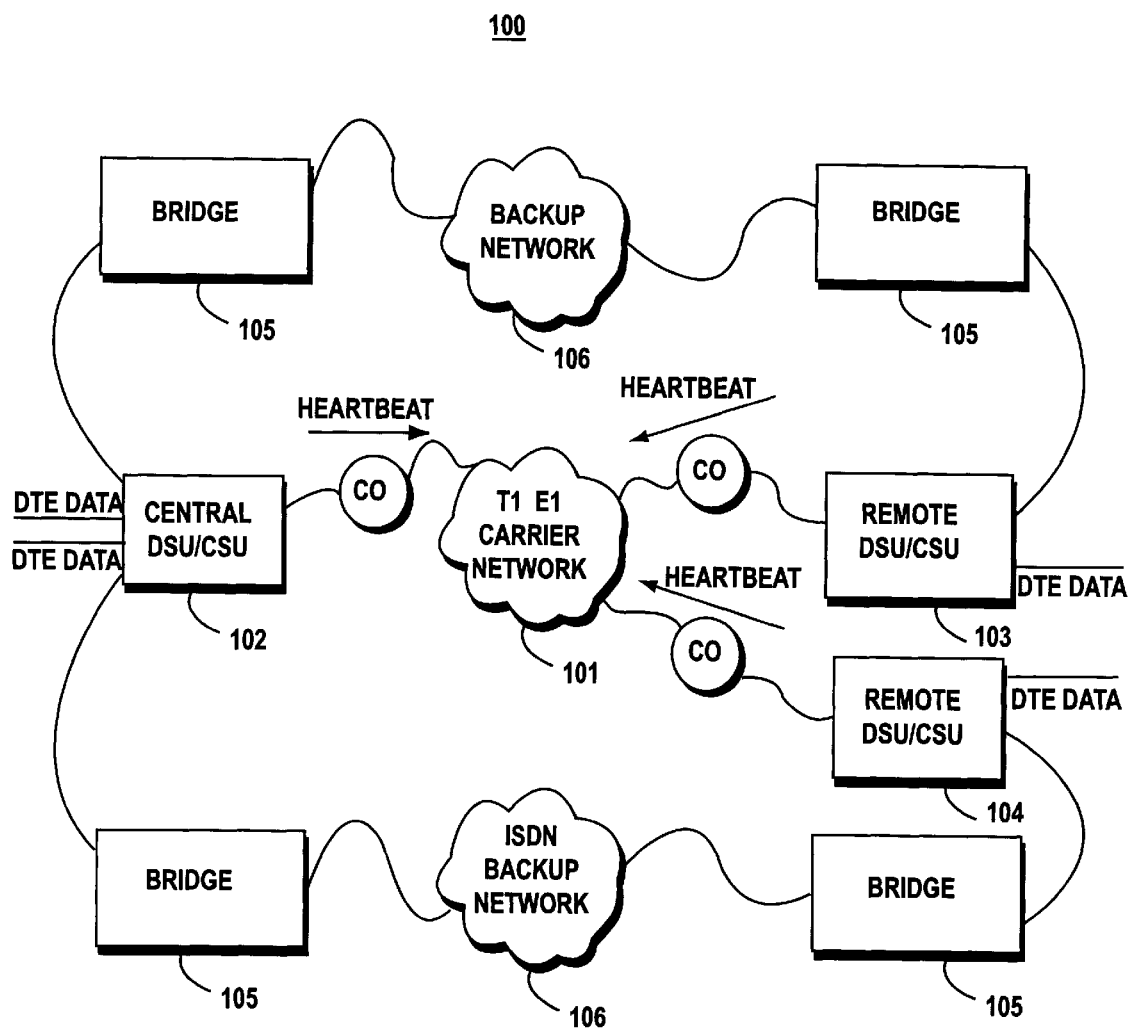
FIG. 1 is a schematic block diagram illustrating a T1/E1 communications environment having DSU/CSU equipment interconnected via a fractional T1/E1 carrier network.

In FIG. 1, an example fractional T1/E1 digital communications network interconnecting a plurality of DSUs/CSUs (102, 103, 104), is illustrated. Any loss of service occurring within primary carrier network 101 is detected by ongoing monitoring of a "heartbeat" signal generated by DSUs/CSUs 102, 103 and 104. Once a communications link between one or more DSUs/CSUs is established, one predetermined unit is designated as a "central" unit (102). The selected central DSU/CSU then periodically sends one or more "remote" DSUs/CSUs a heartbeat signal. Likewise, each remote unit periodically sends a heartbeat signal to the "central" unit. The frequency with which a DSU/CSU sends the heartbeat signal is tailored to meet the network user's timeout requirements. If a heartbeat signal is not detected by a given DSU/CSU for a predetermined amount of time, then that DSU will enter a dial back-up mode wherein an alternate communications link is established, for example, via bridge units 105 through a back-up network such as ISDN network 106.

Figure 2:
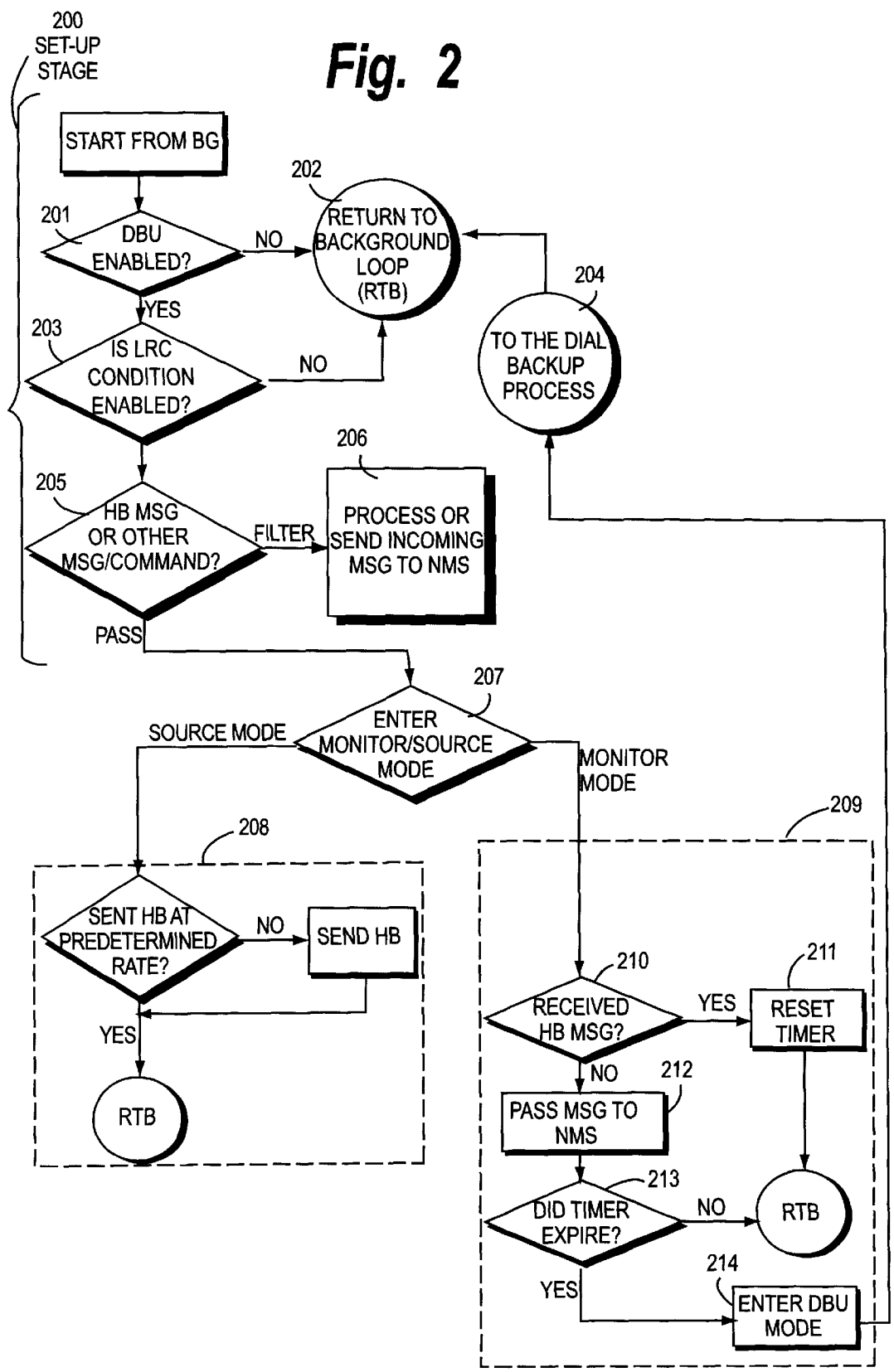
FIG. 2 is a f low chart illustrating the process flow of a task control program for a DSU/CSU in accordance with the present invention.

In accordance with the present invention, the main or "background" control program for each DSU/CSU 102, 103 and 104 is supplemented in accordance with the steps, as shown in the flowchart of FIG. 2, to generate and send a heartbeat signal to other DSUs/CSUs. This heartbeat is carried as a proprietary message on a T1 embedded service channel. An example of a preferred heartbeat message format is shown below in table 1.

TABLE 1

| Idle | Sync | Address | Data | BCC |
| --- | --- | --- | --- | --- | wherein,
Idle=not used;
Sync=1 character (7E—heartbeat message sync character);
Address=Target Address and control (2 characters);
Data=This field (3 characters) is used for the heartbeat message which consists of:
Heartbeat Command—0x38 (1 character w/even parity in the MSB)
Heartbeat source address high—(1 character w/even parity in the MSB)
Heartbeat source address low (1 character w/even parity in the MSB) and;
BCC=Block Check Character (1 character) even parity.

The message format illustrated by TABLE 1 basically consists of a heartbeat identification command and a heartbeat source address contained in the "Data" field portion of the message.

In the digital communications network of FIG. 1, an example arrangement is depicted wherein a predetermined "central" DSU/CSU 102 communicates with two remote DSUs/CSUs. Central DSU/CSU 102 sends a "heartbeat" signal message to both remote DSUs/CSUs 103 and 104. Each remote DSU/CSU monitors the communication link for a heartbeat message. When a heartbeat message is received, each remote DSU resets an internal "watchdog" timer which may be implemented in either hardware or software. If a heartbeat message is not received before the watchdog timer expires, a DSU/CSU assumes that its current communication link through the carrier network 101 is interrupted and establishes a new communications link through backup network 106.

The heartbeat signalling operation at remote DSUs/CSUs is basically the same as at the central DSU/CSU, except that each remote DSU/CSU (103, 104) sends its own heartbeat message to the central DSU/CSU (102). The central DSU/CSU also maintains separate watchdog timers associated with each remote DSU/CSU. For example, when the central unit 102 receives a heartbeat message, it resets a dedicated watchdog timer associated with the remote DSU/CSU from which the message was received. If a heartbeat message is not received, eventually one of the watchdog timers associated with a particular remote unit will expire. The central DSU/CSU 102 then declares the carrier network communication link as "interrupted" for that particular remote DSU/CSU. In this manner, each DSU/CSU heartbeat signal sent to the central DSU/CSU from a remote DSU/CSU operates independently of the heartbeat signaling from other remote DSUs/CSUs.

The heartbeat signaling process is preferably implemented in software as a "task" performed by a DSU/CSU along with other control programs or tasks that are commonly scheduled by a conventional DSU/CSU control software task dispatcher (i.e., the supervisory control program background loop). In accordance with the present invention, the heartbeat signaling process operates in either one of two distinct modes that separately provide the following two primary functions: (1) a heartbeat "source" function, which locally generates heartbeat messages that are sent to remote units; and (2) a heartbeat "monitor" function, which monitors incoming messages for heartbeat messages and ensures that whenever communication is "lost" (interrupted) between the local DSU/CSU and one of the remote units, the local unit establishes an alternate communications link via a "back-up" communications network (i.e., it will force the DSU/CSU to enter a "dial back-up" mode of operation). In this regard a communication with a remote DSU/CSU is considered "lost" when the heartbeat monitor finction stops receiving heartbeats from a remote unit for more than a predetermined amount of time.

FIG. 2 shows a flow chart illustrating an example DSU/CSU control program task which implements the heartbeat signaling process. Basically, the heartbeat signaling process task of the present invention has three operational stages: 1) a "set-up" stage 200 during which various system condition settings are checked and other tasks are performed to initiate the heartbeat signaling process; 2) a heartbeat "source" operating mode during which heartbeat messages are generated and sent at regular intervals; and 3) a heartbeat "monitor" operating mode 215 during which the DSU/CSU looks for and processes heartbeat messages. Ordinarily, a DSU/CSU supervisory control program performs numerous maintenance, monitoring. and control tasks in an ongoing, continuous and repetitive fashion. Generally speaking, such tasks are routinely performed as part of a control program cyclical "background loop" which continuously cycles through their execution. During each cycle or pass through the control program background loop, the heartbeat signaling process of the present invention is executed as an additional task if optionally selected for activation by an operator (e.g., via front panel or software flag settings).

As shown in FIG. 2, steps 201–204, designated as set-up 200, are not absolutely essential to the implementation of the heartbeat signaling process of the present invention, but more or less serve as an example of the type of set-up tasks which may typically need to be performed before activating the heartbeat signaling process. These "set-up" tasks may vary somewhat in accordance with the specific requirements of a particular network and DSUs/CSUs. Such tasks might include checking the status of "front panel" control switches or user programmable software flags. In the present invention, such condition flags may indicate user selected options for controlling activation of the heartbeat signaling process.

In the present example, during the heartbeat signaling process initial set-up 200, various user selectable condition settings are first checked. In a preferred embodiment, an optional dial back-up mode (DBU) can be used to provide an alternate communications link via predetermined back-up network W1 if a communication loss occurs within the fractional network. A software flag is set by the user if the dial back-up mode of operation is desired. This flag is therefore checked to determine if it has been enabled (201). If the DBU selection flag is not enabled, control is returned to the prevailing "background" control process (202). This background control process is usually the DSU/CSU main process control application. In the present invention, the DBU process is preferably checked each pass through the main process application loop.

Next, for example, a loss of remote communications (LRC) condition flag is checked (203). This flag is also set by the user and serves to activate the heartbeat signaling process. If the LRC flag is not enabled, all commands/messages received by the DSU/CSU are passed untouched to the local network management system (NMS) of the DSU/CSU without being examined and control is passed back to the background DSU/CSU control process (202). However, if the flag is enabled, the DSU/CSU examines all messages/commands before passing them on to the NMS.

At another example "set-up" step, 205, incoming messages can be "filtered" or directed for specific processing according to type. For example, if a received message/command is not a heartbeat message, it may need to be immediately passed on to the NMS. In this example, set-up step 205 may function as a type of conditional message/command filter mechanism that identifies and separates out messages that must be passed to the NMS from messages like a heartbeat message, which are process by the DSU/CSU.

Following set-up stage 200, the heartbeat signaling process enters into either the "source" mode or the "monitor" mode. Preferably, upon each execution pass of the background loop, the heartbeat signaling process alternates between performing "source" mode operations 208 and "monitor" mode operations 209. A software mode indicator is therefore maintained by the heartbeat signaling process and checked at step 207 to determine which mode was executed during the immediately preceding pass.

When functioning in the heartbeat source mode (208), a heartbeat message is constructed and sent out across the functional network at predetermined periodic intervals. This may be achieved, for example, through software or hardware timers, checked at each pass through the heartbeat process task. In a similar fashion, the heartbeat monitor process (209) utilizes a watchdog timer arrangement that must be reset by detected heartbeat messages to prevent it from causing the DSU/CSU to enter into the DBU mode. This watchdog timer, which also may be implemented in either hardware or software, is set for a predetermined duration of time. When functioning in the heartbeat monitor mode, each time that a proper heartbeat message is received the watchdog timer is reset (210, 211); any non-heartbeat messages are processed or passed to the NMS (212); and the watchdog timer is then checked for expiration (213). If it has expired, the DSU/CSU is placed in the DBU mode (214). Otherwise, control is returned to the background loop for another pass.

The invention has been described in connection with what is presently considered to be the most practical and preferred embodiments. The above described invention is not to be limited to the disclosed embodiments. It covers various modifications and equivalent arrangements included within the spirit and scope of the appended claims.

What is claimed is:

1. In a fractional T1/E1 digital communications environment, including a common carrier network, providing digital communications between a plurality of data service units/channel service units (DSUs/CSUs) stationed at plural locations, wherein said DSUs/CSUs include a first DSU/CSU and a remote DSU/CSU which is in communication with the first DSU/CSU via the network, a method for detecting at the first DSU/CSU a loss of data due to an interruption of service condition occurring within the common carrier network, comprising the steps of:

a) verifying operation of a designated maintenance channel;

b) sending a periodic message over said network via the operational designated maintenance channel from the remote DSU/CSU to the first DSU/CSU, where the first DSU/CSU and remote DSU/CSU are operating in said environment, said periodic message indicative of DSU/CSU activity;

c) monitoring the operational designated maintenance channel at the first DSU/CSU for periodic messages from the active remote DSU/CSU;

d) maintaining one or more watch-dog timers at each DSU/CSU, said watch-dog timers each corresponding to an individual remote DSU/CSU, e) resetting a watch-dog timer at the first DSU/CSU that corresponds to the remote DSU/CSU in response to reception of said periodic message from the remote DSU/CSU; and f) providing a loss of remote communications indication in response to an expiration of time indication by said watch-dog timer.

2. In a fractional T1/E1 communications environment, a method for detecting at a DSU/CSU a loss of data as set forth in claim 1, wherein said designated maintenance channel is a DS0 channel.

3. A method for a data service unit/channel service unit (DSU/CSU) apparatus for use in a fractional T1/E1 communications environment, said environment providing digital data communications via a common digital communications carrier network between a plurality of data service units/channel service units (DSUs/CSUs), said apparatus including a programmable data processing control unit for controlling said DSUs/CSUs, said control unit programmed to execute said method, said method comprising the steps of:

i) verify operation of a maintenance channel between a first DSU/CSU and an active second DSU/CSU in said environment, where the second DSU/CSU is in communication with the first DSU/CSU via the network;

ii) send a periodic message over said network via the operational maintenance channel from the first DSU/CSU to the second DSU/CSU;

iii) monitor the operational maintenance channel by the second DSU/CSU for a periodic message from the first DSU/CSU;

iv) the second DSU/CSU maintaining a watch-dog timer corresponding to the first DSU/CSU;

v) resetting the watch-dog timer in response to reception of the periodic message originating from the first DSU/CSU; and vi) provide a loss of remote communications indication in response to an expiration of time indication by said watch-dog timer.

4. A method as set forth in claim 3, wherein said designated maintenance channel is a DS0 channel.

5. In a fractional T1/E1 communications environment, said environment providing digital data communications via a common carrier network between a plurality of data service units/channel service units (DSUs/CSUs), a data service unit/channel service unit (DSU/CSU), comprising:

heartbeat generator means for sending a periodic heartbeat signal message over said network via a designated maintenance channel;

heartbeat monitor means for monitoring a designated maintenance channel for periodic heartbeat signal messages;

one or more watch-dog timer mechanisms corresponding to one or more remote DSUs/CSUs in said fractional environment for timing a duration between reception of successive heartbeat signal messages from a remote DSU/CSU; and means for establishing an alternate communications link, if one of the watch-dog timer mechanisms expire prior to receipt of one of the heartbeat signals.

6. A fractional T1/E1 communications environment as set forth in claim 5, wherein said designated maintenance channel is a DS0 channel.

7. In a fractional T1/E1 communications environment, said environment providing digital data communications via a common carrier network between a plurality of data service units/channel service units (DSUs/CSUs), a data service unit/channel service unit (DSU/CSU), comprising:

a heartbeat signal message generator, said generator sending a periodic heartbeat signal message over said network via a designated maintenance channel;

a heartbeat signal message detector, said detector monitoring a designated maintenance channel for periodic heartbeat signal messages;

one or more watch-dog timer mechanisms corresponding to one or more remote DSU/CSU in said fractional environment for timing a duration between reception of successive heartbeat signal messages from a remote DSU/CSU, and means for establishing an alternate communications link if one of the watch-dog timer mechanisms expires prior to receipt of one of the heartbeat signals.

8. A fractional T1/E1 communications environment as set forth in claim 7, wherein said designated maintenance channel is a DS0 channel.

9. In a fractional T1/E1 digital communications environment providing digital communications between a plurality of data service units/channel service units (DSUs/CSUs) stationed at plural locations, a method for detecting at a DSU/CSU a loss of data due to an interruption of service condition occurring within a common carrier network, comprising the steps of:

a) verifying operation of a designated maintenance channel;

b) sending a periodic message over said network via the operational designated maintenance channel from a DSU/CSU operating in said environment, said periodic message indicative of DSU/CSU activity;

c) monitoring the designated maintenance channel at a DSU/CSU for periodic messages from an active remote DSU/CSU;

d) maintaining one or more watch-dog timers at each DSU/CSU, said watch-dog timers each corresponding to an individual remote DSU/CSU;

e) resetting a watch-dog timer at a DSU/CSU in response to reception of said periodic message from a corresponding remote DSU/CSU;

f) providing a loss of remote communications indication in response to an expiration of time indication by said watch-dog timer, and g) establishing an alternate communications link between two DSUs/CSUs.

10. A method as in claim 9 wherein in the periodic message is a heartbeat signal.

* * * * *